W. H. WASHBURN.
STEERING MECHANISM FOR TRACTORS.
APPLICATION FILED MAY 2, 1913.
1,171,570.
Patented Feb. 15, 1916.
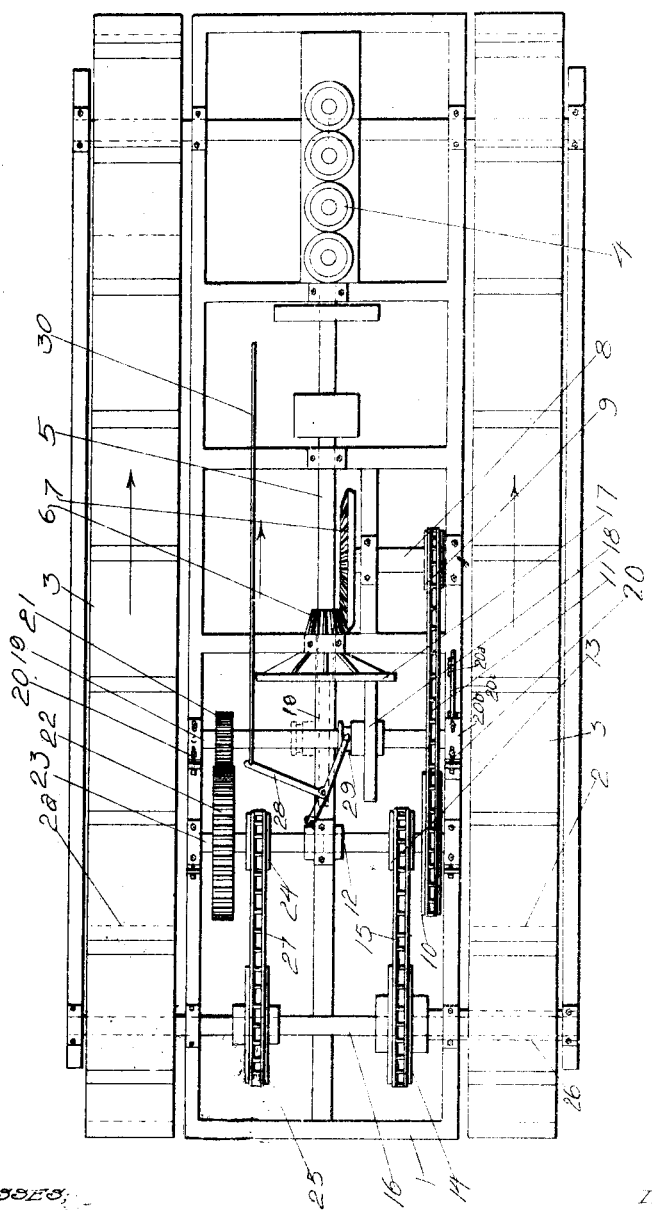

UNITED STATES PATENT OFFICE.

WILLIAM H. WASHBURN, OF PORTLAND, OREGON.

STEERING MECHANISM FOR TRACTORS.

1,171,570.     Specification of Letters Patent.     Patented Feb. 15, 1916.

Application filed May 2, 1913. Serial No. 765,081.

*To all whom it may concern:*

Be it known that I, WILLIAM H. WASHBURN, a citizen of the United States, residing at Portland, in the county of Multnomah and State of Oregon, have invented certain new and useful Improvements in Steering Mechanism for Tractors, of which the following is a specification.

My invention relates to an improvement in steering mechanism for tractors having an endless chain type of tread.

The object of this invention is to control and distribute the regular and nonvariable speed of gears, linkbelt or other positive means of transmission of the propelling power of a tractor so that the relative speeds of the two sides of the tractor may be changed to any rate desired in order to accurately steer the machine. I accomplish these and other objects by means of the structure illustrated in the accompanying drawing, in which the figure shows a plan view of a machine embodying my invention.

Referring to the drawings in detail, 1 designates the frame work of a tractor mounted upon suitable drive wheels 2 and 2ª, at one end of the machine, and upon similarly formed idlers at the other, said wheels at each side of the machine being mounted to travel in a chain tread belt 3.

Upon what may be termed the front end of the frame, is located the source of power, or engine 4, supplying power through the shaft 5, on the rear end of which is a bevel pinion 6 meshing with the bevel gear 7 fixed upon the shaft 8, upon which the wheel 9 is fixed. From the sprocket 9 a sprocket chain 11 leads to and operates upon the sprocket wheel 10 fixed upon the jack shaft 12; and upon this shaft is fixed a sprocket 13 carrying a chain 15 driving the differential gear 14, one side of which is fixed upon the axle 16 and the other side of which is fixed upon the sleeve 26. This axle carries the drive wheels 2 and 2ª.

Upon the rear end of engine shaft 5 is fixed the friction disk 17 against which the friction wheel 18, fitted with a feather upon shaft 19, bears. This shaft is adjustable in its position by means of screw bolts 20, and the pressure of the wheel 18 upon the disk 17 is controlled by means of lever 20ª, which moves the base 20ᵇ, through the rod 20ᶜ.

Upon the shaft 19 is fixed a pinion 21 meshing with a spur gear 22 fixed upon the jack shaft 23. This shaft in turn carries a sprocket wheel 24 upon which is carried the sprocket chain 27 driving sprocket wheel 25 fixed on the axle 16.

Upon the application of power through the shafts 5, 8 and 12, the drive wheels 2 and 2ª will be moved to propel the machine. If they both move at the same rate of speed, the machine will advance in a straight line. But when it is designed to change direction, it is necessary to vary the relative rate of speed, which is accomplished as follows:

Should it be desired to turn the machine to the right, it will be necessary to increase the speed of wheel 2ª above that of wheel 2.

By operating the lever 28, working in the groove 29 formed in the hub of the friction wheel, by means of rod 30, said friction wheel will be thrown toward the rim of the disk 17, which will accelerate the motion of the friction wheel, and through it and the intervening mechanism, the drive wheel 2ª carried on the axle 16. The motion of drive wheel 2 will be correspondingly retarded through the differential gear.

By reversing the direction of rod 30 the friction wheel will be carried toward the center of disk 17 retarding its motion and consequently retarding the motion of drive wheel 2ª, and thereby turning the machine to the left. These results have heretofore been accomplished by means of a steering wheel at the front and placing the mechanism at the interior is a great economy in space, a needed improvement in appearance, and it adds much to the efficiency of the machine.

Having now described my invention what I claim as new, is—

1. In a device of the character described, an engine shaft, a drive shaft mounted adjacent thereto, a sleeve upon one end thereof, a differential gear connecting the sleeve and shaft, a drive wheel fixed upon the sleeve and another upon said shaft, mechanism operatively connecting the engine shaft with the differential gear, a friction disk fixed upon the rear end of the engine shaft, a friction wheel adapted to bear thereon, mechanism fixed upon the drive shaft operatively connected with the friction wheel, and means for shifting the friction wheel to control the relative speed of the drive wheels.

2. In a device of the class referred to, in combination with two main drive or traction wheels, a two part axle therefor, a differential connecting the parts thereof, power furnishing mechanism, positive driving connections from said power furnishing mechanism to said differential for driving both parts of said axle together, an auxiliary driving connection from said power furnishing mechanism to one part of said axle, and means for varying the speed of said auxiliary drive, whereby the speed and direction of one part of said axle can be controlled independently of the other part of said axle and independently of the positive drive to said differential.

3. In a device of the class referred to, in combination with two main drive or traction wheels, a two part axle therefor, a differential connecting the parts thereof, power furnishing mechanism, positive driving connections from said power furnishing mechanism to said differential for driving both parts of said axle together, an auxiliary friction drive connection from said power furnishing mechanism to one part of said axle and means for varying the speed of said friction drive whereby to drive one part of said axle faster or slower through said friction drive independently of said positive drive to said differential, for steering purposes substantially as described.

4. In a device of the character described the combination of a drive shaft, a drive wheel mounted rigidly on one end of the drive shaft, a sleeve revolubly mounted on the other end of the drive shaft, a drive wheel rigidly mounted on the outer end of the sleeve, a differential gear connecting the inner end of the sleeve with the drive shaft, means for driving the differential gear at a fixed ratio with the engine speed and means for driving the drive shaft at variable speed ratios as compared with the engine speed.

In testimony whereof I affix my signature in presence of two witnesses.

WILLIAM H. WASHBURN.

Witnesses:
    EDWIN E. HECKBERT,
    HAZEL A. ARMSTRONG.